United States Patent [19]

Madden et al.

[11] 4,440,347

[45] Apr. 3, 1984

[54] SIMPLIFIED MEANS FOR BALANCING THE LOADS ON A VARIABLE AREA NOZZLE

[75] Inventors: William M. Madden, Palm Springs; Walter H. Wiley, Palm Beach Gardens, both of Fla.

[73] Assignee: United Technologies Corporation, Hartford, Conn.

[21] Appl. No.: 334,494

[22] Filed: Dec. 28, 1981

[51] Int. Cl.³ ............................................. B64C 15/06
[52] U.S. Cl. ............................................... 239/265.39
[58] Field of Search ..................... 239/265.19, 265.33, 239/265.37, 265.39, 265.41; 60/230, 232, 242, 271

[56] References Cited
U.S. PATENT DOCUMENTS 2,972,226  2/1961  Geary ............................. 239/265.39
3,730,436  5/1973  Madden et al. ................ 239/265.39

Primary Examiner—Andres Kashnikow
Attorney, Agent, or Firm—Stephen E. Revis

[57] ABSTRACT

The upstream ends of the flaps of a variable area nozzle are pivotally connected to an axially translatable unison ring. Apparatus is associated with the flaps to cause the flaps to rotate as the unison ring is translated to vary the area of the nozzle. The unison ring includes a balance surface fixed relative thereto which is subject to a net pressure load in the downstream direction thereby reducing the force which an actuator must exert to move the unison ring or to hold the unison ring in fixed position. Preferably the balance surface is an annular surface which extends radially inwardly and has a radially inner edge to which the upstream ends of the flaps are pivotally attached.

9 Claims, 8 Drawing Figures

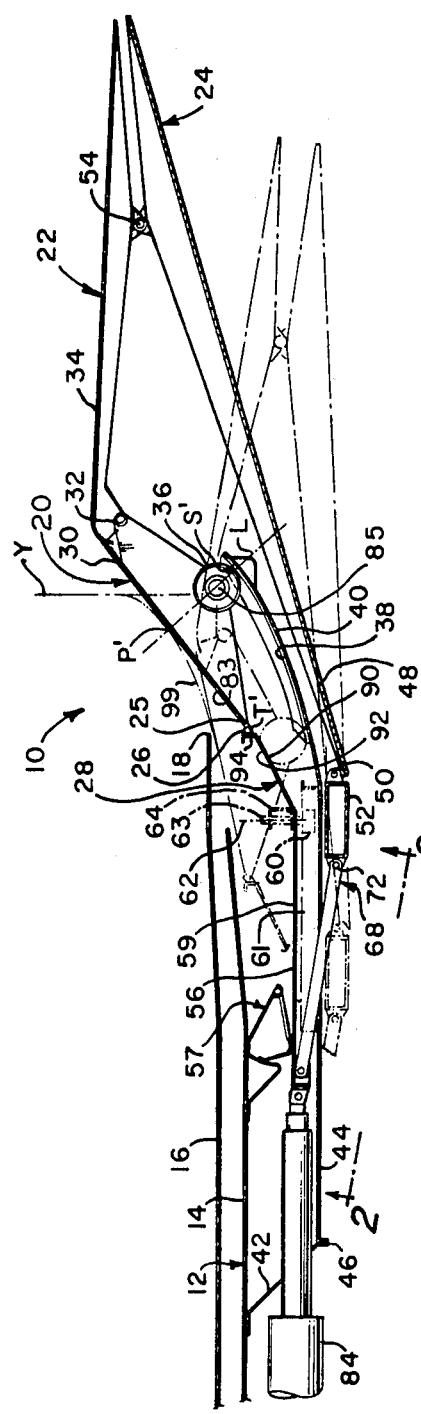
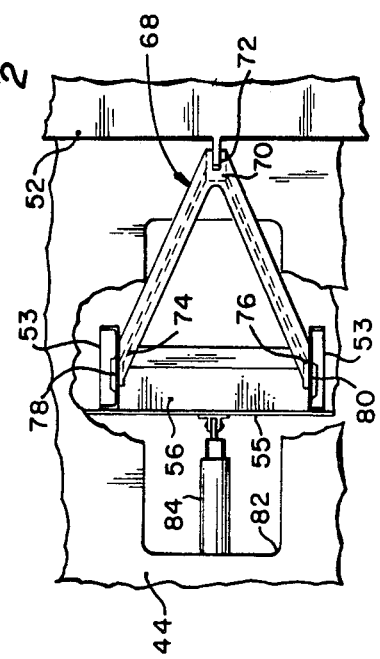
FIG. 1
FIG. 2

SIMPLIFIED MEANS FOR BALANCING THE LOADS ON A VARIABLE AREA NOZZLE

TECHNICAL FIELD

This invention relates to variable area exhaust nozzles for gas turbine engines.

BACKGROUND ART

Variable area exhaust nozzles for gas turbine engines are old in the art and come in many different configurations. Some are simply two-dimensional convergent nozzles, as represented by U.S. Pat. No. 4,013,226 wherein a single flap is actuated by one or more hydraulic actuators and is pivotable about rollers and movable along a curved track which cooperates with the rollers such that the nozzle area may be varied or even blocked. Commonly owned U.S. Pat. No. 3,354,649 shows a three-dimensional convergent nozzle comprising a plurality of flaps pivotally attached to an axially translatable unison ring and which are moved along curved cam tracks by hydraulic actuators.

Convergent/divergent variable area three-dimensional nozzles are also well known. Representative of such nozzles are U.S. Pat. Nos. 3,792,815; 4,141,501; 4,196,856; and 4,245,787. Each of these patents describe nozzles having convergent flaps, divergent flaps, and external nozzle flaps. Except for the '856 patent, in each case either the convergent or external flaps are pivotally connected to fixed engine structure. In the '856 patent the upstream ends of the external flaps are axially translatable independently of the motion of the convergent and divergent flaps by actuator means which operates independently from the actuation system which moves the convergent and divergent flaps. While this allows considerable freedom of motion, the requirement of a second actuation system is undesirable in view of its added weight, cost, and complexity.

It is commonly an objective in nozzle designs to minimize the required actuator loads to operate the nozzle. Thus the nozzle flaps and linkage arrangements are sometimes designated such that the pressure loads acting on certain portions of the nozzle, and which tend to open the nozzle, are partially or even completely balanced by pressure loads which tend to close the nozzle. For example, in aforementioned U.S. Pat. No. 3,792,815 an additional upstream balance flap extends forwardly from the forward end of the convergent nozzle flaps. Pressure loads on these balance flaps tend to rotate the convergent flaps to a closed position to counter loads on the nozzle assembly which are trying to force the nozzle open. While the balancing feature of the '185 patent works well, a simpler, less expensive means for balancing the nozzle assembly is highly desirable.

DISCLOSURE OF INVENTION

One object of the present invention is an improved convergent/divergent variable area nozzle.

Another object of the present invention is a lightweight convergent/divergent nozzle assembly which is easily balanced in order to reduce required actuator loads.

A further object of the present invention is simplified means for reducing the required actuator loads on an axially translatable and rotatable variable area convergent nozzle.

Yet another object of the present invention is a variable area, three-dimensional convergent/divergent nozzle assembly, the motion of which can be readily tailored for a variety of engine applications without the need for complicated linkages.

According to the present invention, a variable area nozzle assembly for a gas turbine engine comprises a plurality of circumferentially disposed nozzle flaps pivotally connected at their forward ends to an axially translatable unison ring, wherein the unison ring includes a forwardly facing annular balance surface fixed relative to the unison ring and subject to a net pressure load having a component in the downstream direction which reduces the force which an actuator must exert to hold the flaps in fixed position and to move the unison ring.

In a preferred embodiment the flaps ride on rollers which follow a curved cam track for varying the area of the nozzle as the unison ring is translated. The upstream ends of the flaps are pivotally connected to the radially inner edge of the balance surface.

The annular balance surface of the unison ring can be sized and oriented to create the balancing force needed or desired. The invention may be used with virtually any axially translatable, variable area nozzle, including convergent/divergent nozzles. It replaces more costly means for balancing nozzle assemblies, such as increasing the length of flaps. When used in conjunction with convergent/divergent nozzle assemblies, the designer can concentrate on obtaining the best exit area ratio schedules without undue concern for balancing, since much of the balancing can be accomplished by simply correctly sizing the balance surface on the unison ring.

The foregoing and other objects, features and advantages of the present invention will become more apparent in the light of the following detailed description of preferred embodiments thereof, as shown in the accompanying drawing.

BRIEF DESCRIPTION OF THE DRAWING

FIG. 1 is a cross-sectional view of a nozzle assembly according to the present invention.

FIG. 2 is a fragmentary view, partly broken away, taken generally along the line 2—2 of FIG. 1.

BEST MODE FOR CARRYING OUT THE INVENTION

Figures 3, 4:
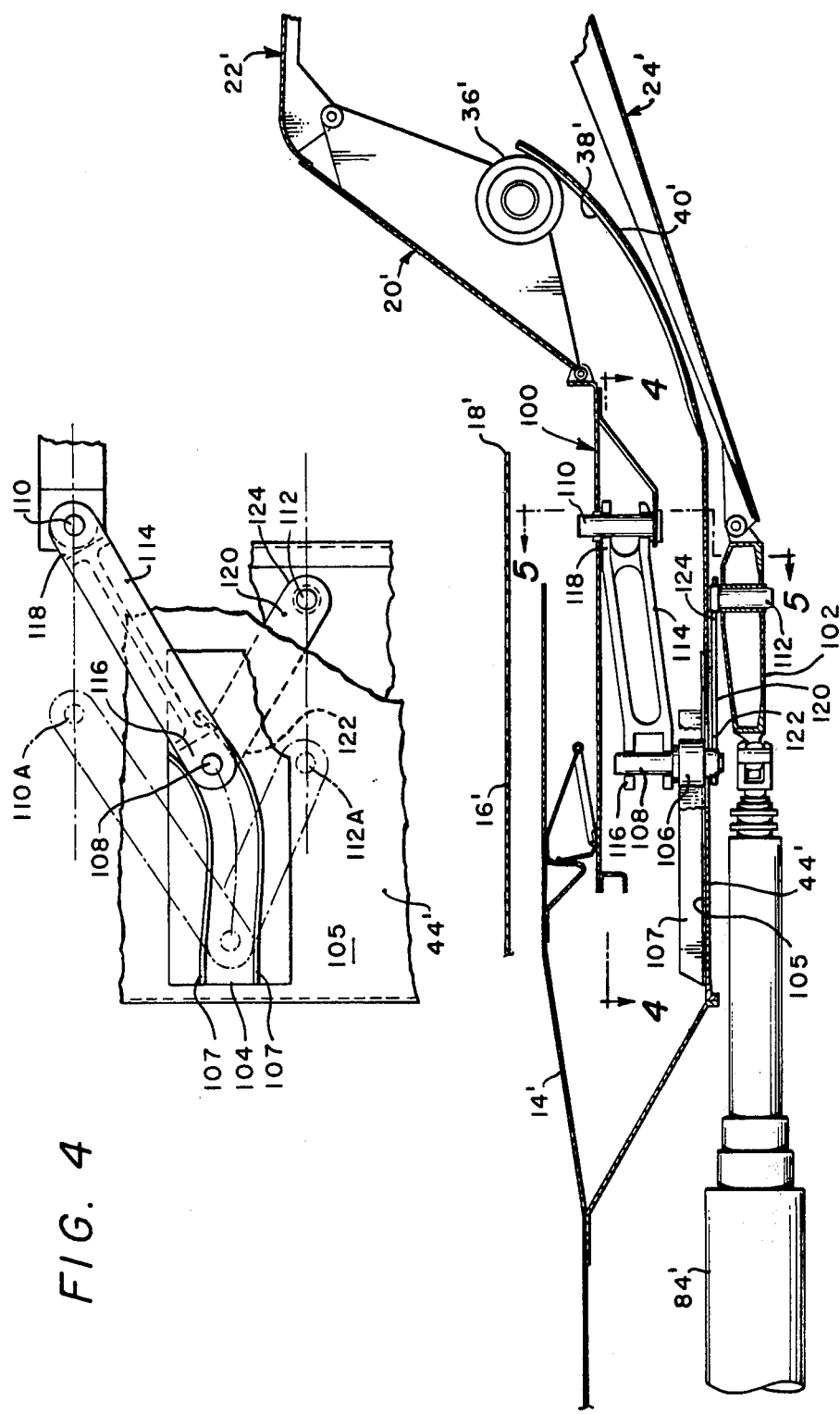
FIG. 3 is a cross-sectional view of a nozzle assembly according to another embodiment of the present invention.
FIG. 4 is a fragmentary view, partly broken away, taken generally along the line 4—4 of FIG. 3.

As an exemplary embodiment of the present invention consider the variable area convergent/divergent nozzle assembly generally represented by the numeral 10 of FIG. 1. The nozzle assembly 10 comprises fixed engine structure 12 including an augmentor duct 14 having a duct liner 16 spaced radially inwardly therefrom defining the augmentor gas flow path having an axis 19, which is the engine axis. The fixed engine structure 12 may also include the engine nacelle, which is not shown. The duct liner 16 has a circular outlet end 18. Circumferentially disposed about the engine axis 19 are a plurality of upstream flaps 20 defining a convergent nozzle, a plurality of downstream flaps 22 defining a divergent nozzle, and a plurality of external flaps 24. Suitable sealing means, not shown, would be provided between circumferentially adjacent flaps to prevent gas leakage during operation. The upstream flaps 20 have their forward ends 25 pivotally connected, as at 26 to an inner unison ring 28 which is able to translate axially. The rearward ends 30 of the upstream flaps 20 are pivotally connected, as at 32, to the forward ends 34 of corresponding downstream flaps 22. Each upstream flap 20 has a cam follower attached to it. In the present embodiment the cam follower is a roller 36. The roller 36 rides along the surface 38 of a cam track 40 as the unison ring 28 translates. The cam track 40 is supported from the augmenter duct 14 through conical and cylindrical support cases 42, 44, respectively which are bolted together at a flanged joint 46. As the forward ends 25 of the flaps 20 translate downstream, the convergent nozzle exit area decreases; and as the forward ends 25 translate upstream, the exit area increases.

The forward ends 48 of the external flaps 24 are pivotally connected, as at 50, to an axially translatable unison ring 52. The pivot point 50 is located radially outwardly of the pivot point 26. The external flap 24 and the downstream flap 22 are pivotally connected, as at 54, to each other at a point downstream of their respective forward ends 48, 34. In this nozzle assembly the exit area of the divergent nozzle defined by the flaps 22 increases as the exit area of the convergent nozzle defined by the flaps 20 increases, and vice versa. It will be apparent that, from the point of view of proper scheduling of the convergent and divergent nozzle portions of the assembly 10, the external flaps 24 could be rods pivotally connected at their forward and rearward ends at the pivot points 50, 54. Flaps are preferred, however, in order to provide a smooth, aerodynamically efficient external contour for the nozzle assembly 10.

In accordance with the present invention, the inner unison ring 28 and outer unison ring 52 are interconnected such that translation of either unison ring will result in simultaneous translation of the other unison ring. As shown in FIGS. 1 and 2, the unison ring 28 includes an annular, axially elongated support structure 56 having an annular, radially outwardly extending lip 55 at its forward end. Seal means 57 attached to the duct 14 abuts the inner cylindrical surface 59 of the structure 56 and prevents exhaust gas leakage. The type of seal shown is not a part of the present invention and is fully described in commonly owned U.S. Pat. No. 3,354,649.

The outer unison ring 52 is rigidly attached to the unison ring support structure 56 (and is thus fixed relative to the inner unison ring 28), via a plurality of circumferentially spaced apart triangular trusses 68. A rearwardly oriented vertex 70 of each truss 68 is connected to the unison ring 52 as at 72. The other two vertices 74, 76 of each truss 68 are connected as at 78, 80, respectively to brackets 53 secured to the unison ring support structure 56. The trusses 68 extend through axially elongated slots 82 in the case 44. A minimum of three trusses 68 are required to position and hold the outer unison ring 52 concentric with the engine axis.

The inner unison ring 28 is positioned and held concentric with the engine axis by a plurality of rollers 60 riding in tracks 61. At least three circumferentially spaced apart roller/track combinations are required. Each roller is attached to and rotates about axis 62 of a radially extending pin 63 which is securely attached to the unison ring structure 56 by means of a bracket 64. The tracks 61 are straight, axial directed, and U-shaped in cross section, with the opening of the U facing radially inwardly. Each track 61 is mounted on the inside of the case 44. The tracks 61 and rollers 60 are circumferentially offset from the trusses 68 and are therefore not actually in the plane of FIG. 1. For this reason they are shown in phantom.

In this embodiment the inner unison ring 28 is translated by a plurality of circumferentially spaced apart actuators 84 mounted to the engine structure 12 by any suitable means, not shown. In view of the rigid interconnection between the inner and outer unison rings 28, 52 via the trusses 68, actuation of the inner unison ring 28 results in translation of the outer unison ring 52 at the same rate of speed and in the same direction as the inner unison ring, as if both the upstream flaps 20 and the external flaps 24 were attached to a common unison ring. In view of the common motion of the unison rings 28, 52, the motion of the flaps 20, 22, 24, relative to each other is solely a function of the lengths of the links of the four-bar linkage defined by the flap pivot points 26, 32, 54 and 50. The nozzle flaps 20, 22, 24 are shown in solid lines in their minimum exit area position and in phantom in their maximum area position.

The shape of the cam track surface 38 is not critical to the mechanical functioning of the nozzle assembly 10, and may be selected based upon any number of criteria, including physical and aerodynamic constraints. It has been determined, however, to be particularly advantageous to have the cam track 38 in the shape of a tractrix curve such that a point P' on the surface 83 of each flap 20 traces a tractrix curve having as its X-axis an axial line passing through the pivot point 26. (Note: Variable area convergent nozzles having flaps which are attached to a translatable unison ring and which ride in tractrix shaped cam tracks have been used on engines of the prior art.) A tractrix curve is represented by the following equation and is shown in FIG. 8:

$$x = a \cdot \text{sech}^{-1} \frac{y}{a} - \sqrt{a^2 - y^2}$$

Figure 8:
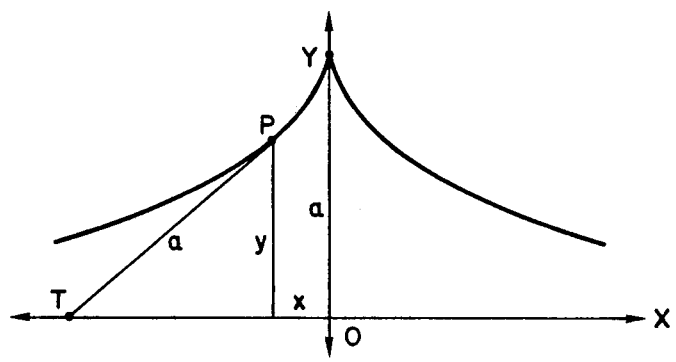
FIG. 8 is a graph of a tractrix curve.

With reference to FIG. 8, a tractrix curve is the locus of the end P of a tangent line of fixed length "a" as the other end T of the tangent line is moving along the X-axis. If the point P' on the surface 83 of a flap 20 corresponds to the point P of FIG. 8; and if the point T' is the pivot point 26 of FIG. 1 and corresponds to the point T of FIG. 8; then the line P'T' corresponds to the line PT of FIG. 8 with the point T' traveling along the X-axis, and the constant "a" in the equation is the length of P'T'. The point P' will trace out a tractrix curve; and the flap 20 will always be tangent to the curve at the point P'. Selection of one position for the point P' will dictate the axial location of the Y-axis and will fix the axial position of the tractrix curve relative to the fixed engine structure. The Y-axis for the nozzle assembly 10 is shown in phantom in FIG. 1.

If a line L passing through point P' perpendicular to the surface 83 also passes through the center 85 of the roller 36, and if that line has an end point S' on the periphery of the roller 36, then the point S' will trace out a tractrix curve as the point P' traces out a tractrix curve. The curve traced by the point S' will then define the desired shape and location of the cam track surface 38 which will yield the desired motion for the surfaces 83 of the flap 20. The tractrix curve traced by the point P' is shown in phantom in FIG. 1 and is labeled with the reference numeral 99. With this arrangement the pressure load on the surface of each flap 20 is always perpendicular to a tangent to the surface 38 of its respective cam track 40 at the point of contact of the roller 36 for all positions of the flaps 20. If the point P' is also the center of pressure for a flap 20, then the pressure load on each flap 20 will not create a moment about the axis 85 of the roller 36. The point P' may, of course, also be located either upstream or downstream of the center of pressure.

Thus, selection of the location of the point P' on the surface 83 of the flap 20 can lead to either a clockwise, counterclockwise, or no moment about the roller axis due to the loads on the flaps 20. This feature of the present invention can be advantageously used to help balance the nozzle assembly to reduce actuator loads and to assure that if the actuators 84 fail the nozzles will return to or remain in a fully open or fully closed position, as desired.

Another advantage of the nozzle assembly 10 is that, as the flaps 20 translate in the upstream direction, a portion of the flap surface 83 is moved to a position radially outwardly of and forward of the outlet end 18 of the duct liner 16. The outlet end 18 is intentionally placed as far downstream and in as close proximity to the surface 83 of the flaps 20 as possible without interfering with the motion of the flaps 20. When the convergent nozzle defined by the flaps 20 is in its maximum area position, a major portion of the surface 83 of the flaps 20 is upstream of the outlet end 18 and is thereby protected from direct exposure to the hot exhaust gases. Cooling air traveling downstream between the liner 16 and the duct 14 not only passes over the surfaces 83 of the flaps 20, but also flows over and cools the divergent flaps 22 for all positions of the flaps. Significantly less air is required to cool the flaps 20, 22 in the present configuration as compared, for example, to that required to cool the convergent flaps of the C/D nozzle shown in U.S. Pat. No. 3,792,815.

The unison ring 28 is shown including a balancing extension 90 to aid in reducing the required actuator loads and hence the cost and weight of the actuation system, to enable reduction in the length, weight and cost of the convergent flaps 20 (which would otherwise have to made longer to achieve the same balancing effect, as explained above). The balancing extension 90 includes a forwardly facing annular balance surface 92 which acts like a piston area. The surface 92 has a pressure drop thereacross such that it is subjected to a net pressure load having a component in the downstream direction resulting in a net downstream force on the unison ring 28. This downstream force is used in conjunction with the balancing feature of the tractrix curve as discussed above. If desired, the surface 92 can be sized and oriented such that the downstream component of the pressure load on the surface 92 is sufficiently large to move the convergent flaps 20 to their minimum area position if the actuators 84 fail. In the embodiment shown in FIG. 1, the balance surface 92 has a radially inner edge 94. The flaps 20 are pivotally connected at 26 to the inner edge of the balancing extension 90, and the pressure drop across the surface 92 is thereby substantially the same as the pressure drop across the upstream flaps 20. This balancing feature of the nozzle assembly 10 of FIGS. 1 and 2 may be used to reduce the actuation loads on any nozzle assembly whose upstream flaps are pivotally connected to a unison ring for axial movement thereof.

Figure 5:
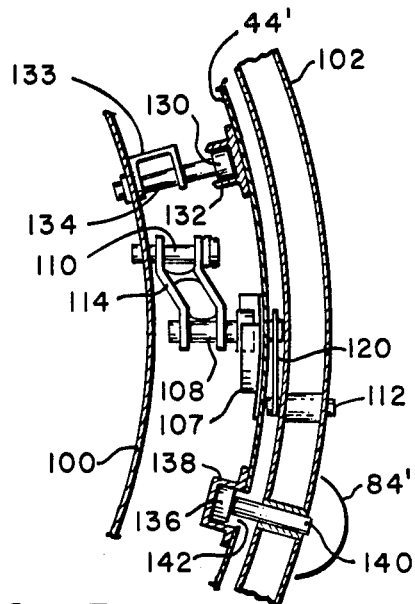
FIG. 5 is a fragmentary cross-sectional view taken along the line 5—5 of FIG. 3.

Another degree of freedom may be added to the system by having the inner and outer unison rings 28, 52 translate axially at different rates of speed relative to each other but in accordance with a predetermined relationship or schedule. FIGS. 3 thru 5 show one means for interconnecting the inner and outer unison rings 28, 52 which provides this additional degree of freedom. In FIGS. 3 through 5, elements which are the same or similar to those of FIGS. 1 and 2 are given the same but primed reference numerals. As in the embodiment of FIGS. 1 and 2, the upstream flaps 20' are connected to an inner unison ring which is herein designated by the reference numeral 100; and the external flaps 24' are connected to an outer unison ring 102 which is translated by a plurality of actuators 84'. In this embodiment the case 44' has at least one and preferably a plurality of circumferentially spaced apart cam tracks 104 attached to its inner surface 105. The tracks 104 are defined by a pair of spaced apart substantially, radially inwardly extending parallel walls 107. At least a portion of the cam track 104 extends in a non-axial direction, as shown in FIG. 4. A cam follower or roller 106 rides in each cam track 104. A cam follower pin 108 extends through each roller 106 in a radial direction. Attached to the inner unison ring 100 at an axial location rearward of the pin 108 is a radially extending inner pin 110. Attached to the outer unison ring 102 also at an axial location rearward of the pin 108 is an outer radially extending pin 112. An inner connecting link 114 is pivotally connected at its foward end 116 to the cam follower pin 108 and at its rearward end 118 to the inner pin 110. An outer connecting link 120 is pivotally connected at its forward end 122 to the cam follower pin 108 and at its rearward end 124 to the outer pin 112.

As shown in FIG. 5, the inner unison ring 100 is positioned and held concentric with respect to the engine axis by a plurality of rollers 130 which ride in straight, axial tracks 132 (shown only in end view) attached to the case 44'. This is very similar to the manner in which the unison ring 28 of the embodiment shown in FIGS. 1 and 2 is positioned and held concentric. Thus, each track 132 is U-shaped in cross section with the open portion of the U facing radially inwardly. Each roller is attached to and rotates about the axis of a radially oriented pin 134 which is fixedly secured to the unison ring 100 by means of a bracket 133. At least three rollers 130 and corresponding tracks 132 circumferentially spaced about the engine axis are required for positive positioning.

In similar fashion the outer unison ring 112 is positioned and held concentric with the engine axis by a plurality of rollers 136 which ride in straight, axial tracks 138 attached to the case 44'. The tracks 138 are U-shaped in cross section with the opening of the U facing radially outwardly. The rollers 138 are attached to radially outwardly extending pins 140 which are secured to the outer unison ring 102. The case 44' includes an axial slot 142 aligned with a track 138 through which the pin 140 extends.

In operation, actuators 84' translate the outer unison ring 102 at a desired rate of speed. The inner unison ring 100 is simultaneously translated through the interconnecting linkage. The pins 110, 112 always travel in an axial line; however, since the roller 106 does not travel in an axially straight line the links 114, 120 rotate as they translate. The result is that the unison rings 100, 102 translate at different speeds relative to each other. FIG. 4 shows the links 114, 120 in phantom when the unison ring 102 is in its forwardmost position. It is apparent from the drawing that the pin 110, in moving to the position designated 110A, has translated further than the pin 112 in moving to its new position at 112A.

In the embodiment of FIGS. 1 and 2, for any one particular schedule of movement of the convergent nozzle flaps 20 there is only one fixed exit area schedule of movement for the divergent nozzle flaps 22; and that latter fixed exit area schedule is determined by the four-bar linkage defined by the flaps. Thus, the flap lengths (or rather the lengths of the links from pivot to pivot) must be chosen such that for one or two positions of the nozzle the exit area ratios are, so to speak, "perfct"; but, at other positions the exit areas are a compromise. With the embodiment of FIGS. 3-5, the divergent flap exit area schedule is not determined by a fixed four-bar linkage since the shape of cam track 104 can be used to tailor or trim the position of the divergent flaps.

Figure 7:
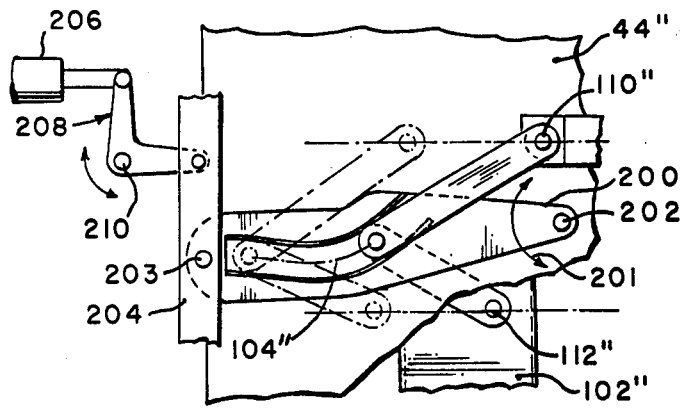
FIG. 7 is a fragmentary view, partly broken away, taken generally along the line 7—7 of FIG. 6.
Figure 6:
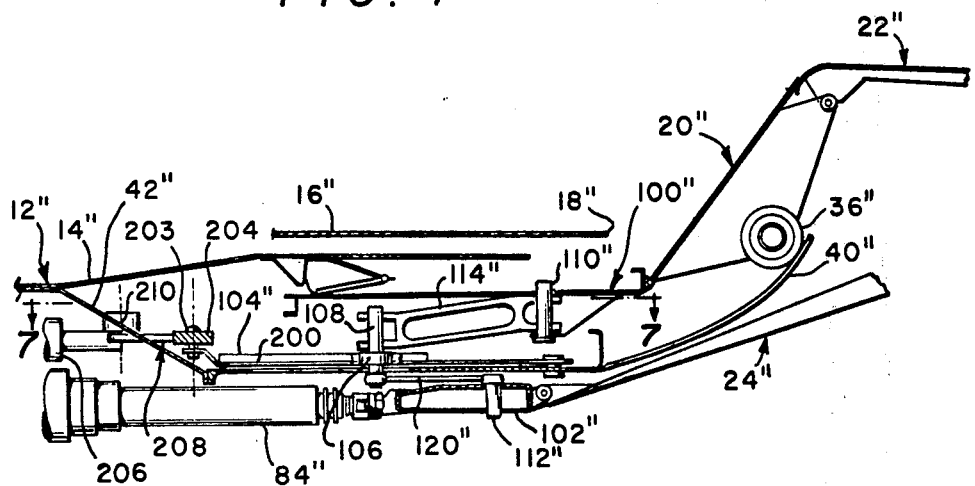
FIG. 6 is a cross-sectional view showing a further embodiment of a nozzle assembly according to the present invention.

FIGS. 6 and 7 show an alternate arrangement for the nozzle assembly described with respect to FIGS. 3 and 4 which provides yet additional flexibility in scheduling the exit areas of the convergent and divergent nozzles. In FIGS. 6 and 7 elements which are the same as elements of FIGS. 3, 4 and 5 are given the same but double primed reference numerals. This embodiment differs from the embodiment shown in FIGS. 3 and 4 in that the cam tracks 104″ are movable. As best shown in FIG. 7, each cam track 104″ is secured to a plate 200, which is pivotally secured to the case 44″ at 202 for rotation (as indicated by the arrows 201) about a radially extending axis. These circumferentially spaced apart plates 200, each carry a cam track 104″ and are interconnected by a unison ring 204 pivotally attached to each plate 200 as at 203. The unison ring 204 is actuated by one or more hydraulic cylinders 206 through an L-shaped actuation link 208 pivotally secured to the conical case 42″, as at 210. (Note the case 42″ is not shown in FIG. 7 for purposes of clarity.) The cylinder 206 is suitably secured to the engine fixed structure 12″ by means not shown. For any one position of the cam track 104″, the mechanical operation of the nozzle assembly of FIGS. 6 and 7 is essentially the same as the mechanical operation of the nozzle assembly of FIGS. 3-5. This embodiment, however, permits changing the exit area schedule during flight.

Although the invention has been shown and described with respect to a preferred embodiment thereof, it should be understood by those skilled in the art that various changes and omissions in the form and detail thereof may be made therein without departing from the spirit and scope of the invention.

We claim:

1. A variable area nozzle assembly for a gas turbine engine comprising:
   engine fixed structure;
   unison ring means supported from said fixed structure and being axially translatable and including a first unison ring;
   at least one actuator adapted to engage and axially translate said unison ring means;
   a plurality of upstream flaps circumferentially disposed about the engine axis defining a convergent nozzle, each of said upstream flaps having a forward end and a rearward end, said forward end of each flap being pivotally connected to said first unison ring for translation therewith;
   cam track means supported by said fixed structure, said cam track means including a cam track associated with each of said upstream flaps and disposed radially outwardly thereof, each of said upstream flaps including follower means adapted to rest on the track associated therewith and to follow said track as said unison ring means translates, said track being shaped to cause rotation of said flaps as said unison ring means translates;
   wherein said unison ring means includes balance means having a forwardly facing annular balance surface, said balance means being fixed relative to said first unison ring, said balance surface being subjected to a net pressure load having a component in the downstream direction which reduces the force which said actuator must exert to hold said flaps in a fixed position and to move said first unison ring.

2. The nozzle assembly according to claim 1 wherein said annular balance surface has a radially inner edge, said edge being adjacent said forward ends of said upstream flaps whereby the pressure drop across said balance surface is substantially the same as the pressure drop across said upstream flaps in the vicinity of the forward ends of said flaps, said upstream flaps being pivotally connected to said inner edge.

3. The nozzle assembly according to claims 1 or 2 including a plurality of downstream flaps circumferentially disposed about the engine axis and defining a divergent nozzle, each downstream flap having a forward end and a downstream end, said forward ends of said downstream flaps being pivotally connected to said rearward ends of said upstream flaps;
   a plurality of connecting means, one associated with each of said downstream flaps, each connecting means having a forward end pivotally mounted to said unison ring means radially outwardly from the pivotal connection of said upstream flaps, each connecting means having a rearward end pivotally mounted to its associated downstream flap rearwardly of said forward end of said downstream flap.

4. The nozzle assembly according to claim 3 wherein said first unison ring is an inner unison ring and said unison ring means includes an outer unison ring, and said connecting means is pivotally connected to said outer unison ring, said inner and outer unison rings being interconnected such that translation of one of them results in translation of the other of them.

5. The nozzle assembly according to claim 4 wherein said forward ends of said connecting means and said forward ends of said upstream flaps are fixed relative to each other.

6. The nozzle assembly according to claim 4 wherein each of said connecting means is an external flap.

7. A variable area nozzle assembly for a gas turbine engine comprising:
   engine fixed structure;
   unison ring means supported from said fixed structure and axially translatable, said unison ring means including a first unison ring;
   at least one actuator adapted to engage and axially translate said unison ring means;
   a plurality of upstream flaps circumferentially disposed about the engine axis defining a nozzle, each of said upstream flaps having a forward end and a rearward end, said forward end of the flap being pivotally connected to said first unison ring for translation therewith;

means associated with said flaps for causing rotation of said flaps as said unison ring means translates to vary the area of said nozzle;

wherein said unison ring means includes balance means having a forwardly facing annular balance surface, said balance means being fixed relative to said first unison ring, said balance surface being subjected to a net pressure load having a component in the downstream direction which reduces the force which said actuator must exert to hold said flaps in a fixed position and to translate said unison ring means.

8. The nozzle assembly according to claim 7 wherein said annular balance surface includes a radially inner edge, and said flaps are pivotally connected to said inner edge.

9. The nozzle assembly according to claim 8 wherein said nozzle is a convergent nozzle and said nozzle assembly includes cam track means supported from said fixed engine structure, each of said flaps including cam follower means associated therewith and adapted to ride in said cam track means as said unison ring means is translated to vary the area of said nozzle.

* * * * *